United States Patent

[11] 3,561,544

| [72] | Inventor | Herman Farmer<br>Livonia, Mich. |
|---|---|---|
| [21] | Appl. No. | 878,998 |
| [22] | Filed | Dec. 5, 1969 |
| [45] | Patented | Feb. 9, 1971 |
| [73] | Assignee | Buhr Machine Tool Corporation<br>a corporation of Delaware. by mesne assignment<br>Continuation of application Ser. No. 694,998, Jan. 2, 1968, now abandoned. |

[54] PARALLEL SHAFT DRIVEN MACHINE TOOL WAY OR QUILL UNIT
9 Claims, 4 Drawing Figs.

[52] U.S. Cl. .................................................. 173/145,
74/675, 74/665 (Discl.), 74/781 (Discl.)
[51] Int. Cl. ........................................................ F16h 37/06
[50] Field of Search ........................................... 74/675;
173/145, 146

[56] References Cited
UNITED STATES PATENTS

| 1,774,831 | 9/1930 | Henin | 74/675 |
| 2,519,042 | 8/1950 | Granberg et al. | 74/675X |
| 3,182,526 | 5/1965 | Zajac | 74/675 |
| 3,213,711 | 10/1965 | Van Den Kieboom | 74/675 |
| 3,283,664 | 11/1966 | Cross et al. | 74/675UX |
| 3,358,529 | 12/1967 | Van Den Kieboom | 74/675 |
| 3,429,201 | 2/1969 | Zucchellini | 74/675 |

*Primary Examiner*—Arthur T. McKeon
*Attorney*—Whittemore, Hulbert & Belknap

ABSTRACT: Two different versions of a machine tool unit are disclosed for use particularly in the mass production machining of castings, forgings and like heavy workpieces at longitudinally spaced stations of factory transfer equipment, past which stations the workpieces are successively indexed, on pallets or otherwise. However, the combination of the invention also pertains generally to individual tool units of the dual feed and traverse motor type, not necessarily operating in such a transfer system, but characterized by a speed reducer, drivingly interposed between a prime mover, such as a feed motor, and a driven machine tool unit or units.

INVENTOR
HERMAN FARMER

BY Whittemore Hulbert & Belknap
ATTORNEYS

INVENTOR
HERMAN FARMER

ATTORNEYS

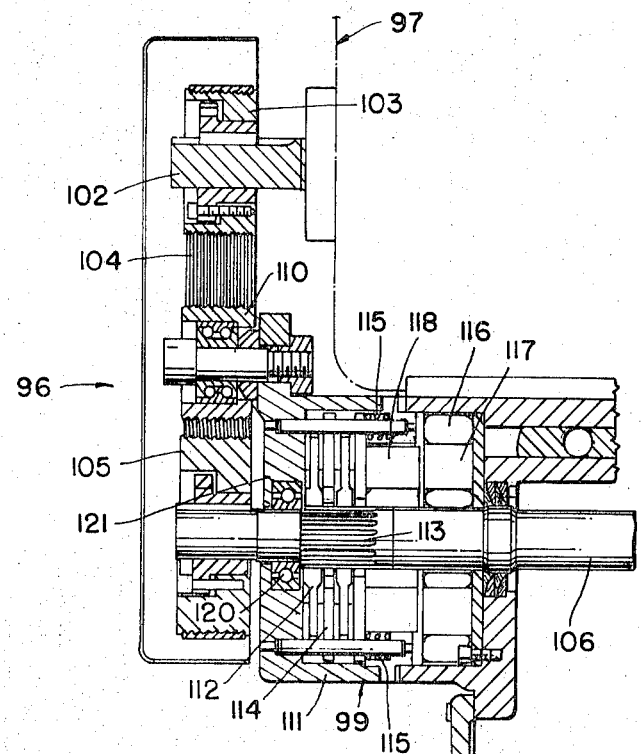
FIG.3A
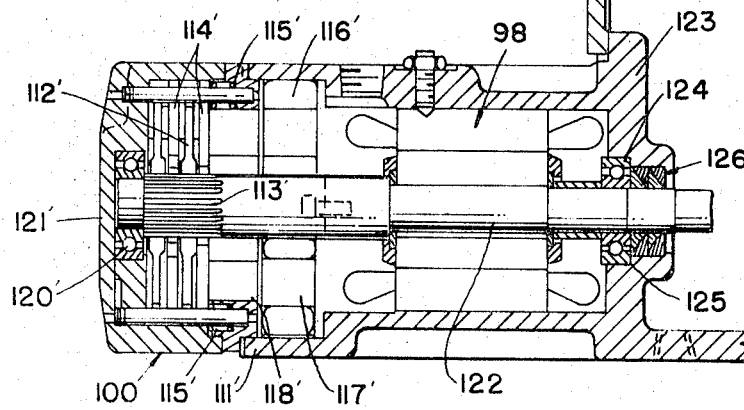
INVENTOR
HERMAN FARMER
ATTORNEYS

PARALLEL SHAFT DRIVEN MACHINE TOOL WAY OR QUILL UNIT

This application is a continuation of Ser. No. 694,998, filed Jan. 2, 1968, now abandoned.

Of the two adaptations, one is a way type in which a rotative machine tool or cutter is mounted on a way, saddle, platen or equivalent sliding support and is individually driven rotatively in operation by motor means also carried by that support. In the other, quill-type embodiment, the cutter tool is rotatively driven, typically through an internally splined quill and an elongated spline, by the same motor of the two-motor system as effects the machining feed-in of the cutter.

In both versions of the improved equipment there are a pair of suitably rated feed and rapid traverse motors operating on parallel axes, a spring-applied electromagnetic brake controlling at least the traverse motor of the pair, and a reducer assembly of a special single, two-state planetary type through which the tool is moved by screw means in the feed phase at a great speed reduction as compared with the rated speed of the feed motor.

Further in accordance with the invention, generous space is afforded for change gear means incorporated in certain spur gear connections from the feed motor to the reducer, with a corresponding enlargement of range of feed speeds at the tool, either by way of an increase or decrease in the speed reduction. Corresponding space and change speed gearing permit a desirable variation in rotative tool speed in the case of the quill unit.

More particularly, there is disclosed a combination of the general sort referred to, in which the reducer assembly is a relatively simple but efficient one involving a fixed differential drive of the output side at a greatly reduced speed ratio from the feed motor, using a single, two-state cluster-type planetary gear. This gear radially inwardly meshes with a sun gear on a shaft driven through a spur gear train from the feed motor. Its two gear sets mesh radially outwardly with a pair of internally toothed rings, one of which is drivingly connected to an output screw and nut unit, preferably a ball type, by which the tool-mounting way or the quill is advanced.

The other ring gear has external spur gear teeth about its periphery by which it, and the gear reducer as a whole, are driven, in the traverse phase of operation, from a pinion on the output end of the shaft of the traverse motor. During the feed phase of operation the last named pinion and ring gear meshed thereby are braked to a stop, for example, by the brake unit of the traverse motor.

Timed energization of the electromagnetic feed and traverse motor brake units is under the control of limit switch means (not germane to the invention) on the way or quill units and the bed of the installation.

A choice of the numbers of teeth of the sun gear, the planetary cluster gear and the internal ring gears results in a great reduction of feed motor speed as applied to the ultimate output ball nut and screw unit; and this choice is amplified optionally at the change gear trains.

BACKGROUND OF THE INVENTION

1. Field of the Invention

The invention finds wide application in the machine tool industry, in particular the mass production field wherein parts are periodically indexed past a multiplicity of machine tool units successively engaging the parts from a side or sides of the path of indexing advance thereof. However, as indicated above, the invention also finds application in less complex installations.

2. Description of the Prior Art

The patents to Zajac, U.S. Pat. No. 3,182,526 of May 11, 1965, and Van Den Kieboom, U.S. Pat. No. 3,213,711 of Oct. 26, 1965, are the most pertinent of which I am aware that deal with the way, platen or saddle-type embodiment of the invention. The patent to Cross et al. U.S. Pat. No. 3,283,664 of Nov. 8, 1966, shows a generally related type of feed and drive unit for a quill-type installation.

None of these patents, however, shows the special combination of feed and traverse motor, electromagnetic brake, change gear and simplified planetary gear reducer components of the present invention.

SUMMARY OF THE INVENTION

The invention affords entirely mechanical (though electrically powered and controlled) variable speed machine tool way or quill equipment of great versatility which, in regard to the feed and traverse motor subassemblies thereof, constitutes a substitute for the not-entirely-satisfactory hydraulically powered drives now in use. By reason of the presence of the mentioned reducer assembly, a basic speed reduction ratio from the feed motor to the output of the reducer may be had amounting to as much as of the order of 66:1; and this stepdown may be modified supplementally by the use of change spur gear sets in the drive from the feed motor up to the speed reducer.

Moreover, the speed reducer may be, and preferably is, operated, particularly at the change of drive from one motor to another, in such manner that the transition is a smooth, shock-free one. This is a very desirable feature in the operation of the machine tool in boring, drilling, reaming, threading and like operations.

BRIEF DESCRIPTION OF THE DRAWINGS

FIGS. 3A and 3B constitute a single view in vertical section through the second, quill drive adaptation of the invention, of which certain gear and drive axes are, as is usual, offset from one another, FIG. 3A in general presenting the braked feed and traverse motor subassemblies and FIG. 3B in general presenting the remaining spur gear train, reducer and quill drive components.

DESCRIPTION OF THE PREFERRED EMBODIMENTS

Way-Type Adaptation

Figure 1:
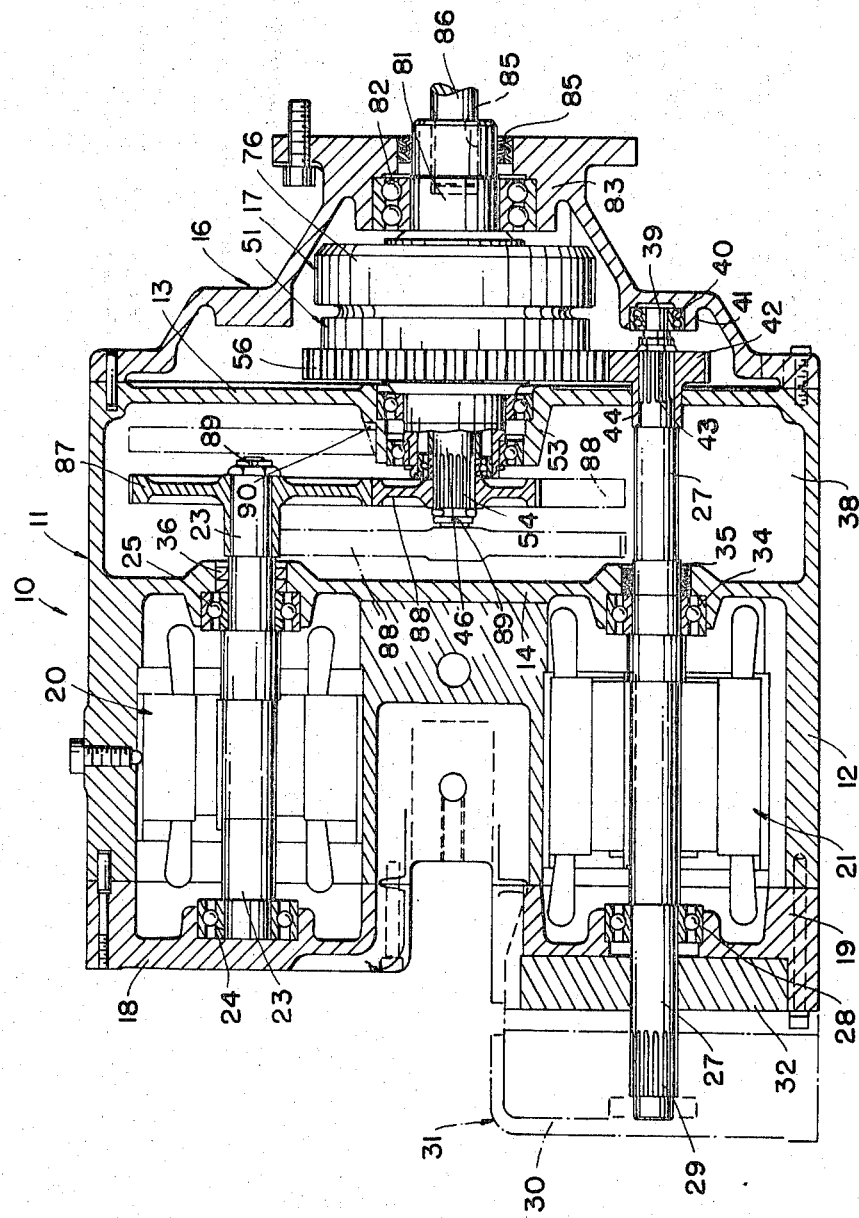
FIG. 1 is a view in section through a way unit adaptation of the combination of the invention, certain change gear provisions being indicated in dot-dash line, the view being in planes intersecting along the axis of the reducer assembly.

This embodiment of the parallel shaft driven equipment of the invention, generally designated by the reference numeral 10 in FIG. 1, has its operating components mounted in a housing structure 11 comprised of a cast main or body housing 12 having an upright transverse, right-hand end wall 13 and an upright internal transverse wall 14 spaced therefrom; a right-hand end closure casting 16, within which the reducer assembly, generally designated 17, is disposed; and a pair of left-hand end closure castings 18, 19, these completing the housing provisions, respectively, for an electrical feed motor 20 and an electrical traverse motor 21.

Feed motor 20 may be a standard one-half horsepower one running at 1,160 r.p.m. under 460/480 volt, 60-cycle, three-phase energization. Traverse motor 21 may be rated two horsepower at 1,700 r.p.m., being powered from a 460 volt, 60-cycle, three-phase source. The shaft 23 of motor 20 is mounted at one end by a ball bearing 24 in the closure member 18, which is bolted to housing body 12, and at the other end by another ball bearing 25 in internal housing wall 14. Traverse motor 21 has its shaft 27 journaled adjacent one end by a ball bearing 28 in housing closure member 19. This member is bolted to housing body 12, with a splined extremity 29 of shaft 27 extending into the housing 30 of a spring-applied electromagnetic brake, generally designated 31 in FIG. 1. Between the bearing 28 and the splined shaft end 29 the shaft 27 passes through a hole in a relatively thick, disclike brake housing member 32. Traverse motor shaft 27 is medially journaled by a ball bearing 34 in the internal housing wall 14, and seals 35 are applied in this zone to shaft 27 and to feed motor shaft 23. Similar seals 36 are applied to feed motor shaft 23. The above-described structure completes in a general way the feed motor and braked traverse motor input provisions of the way drive unit 10.

Figure 3B:
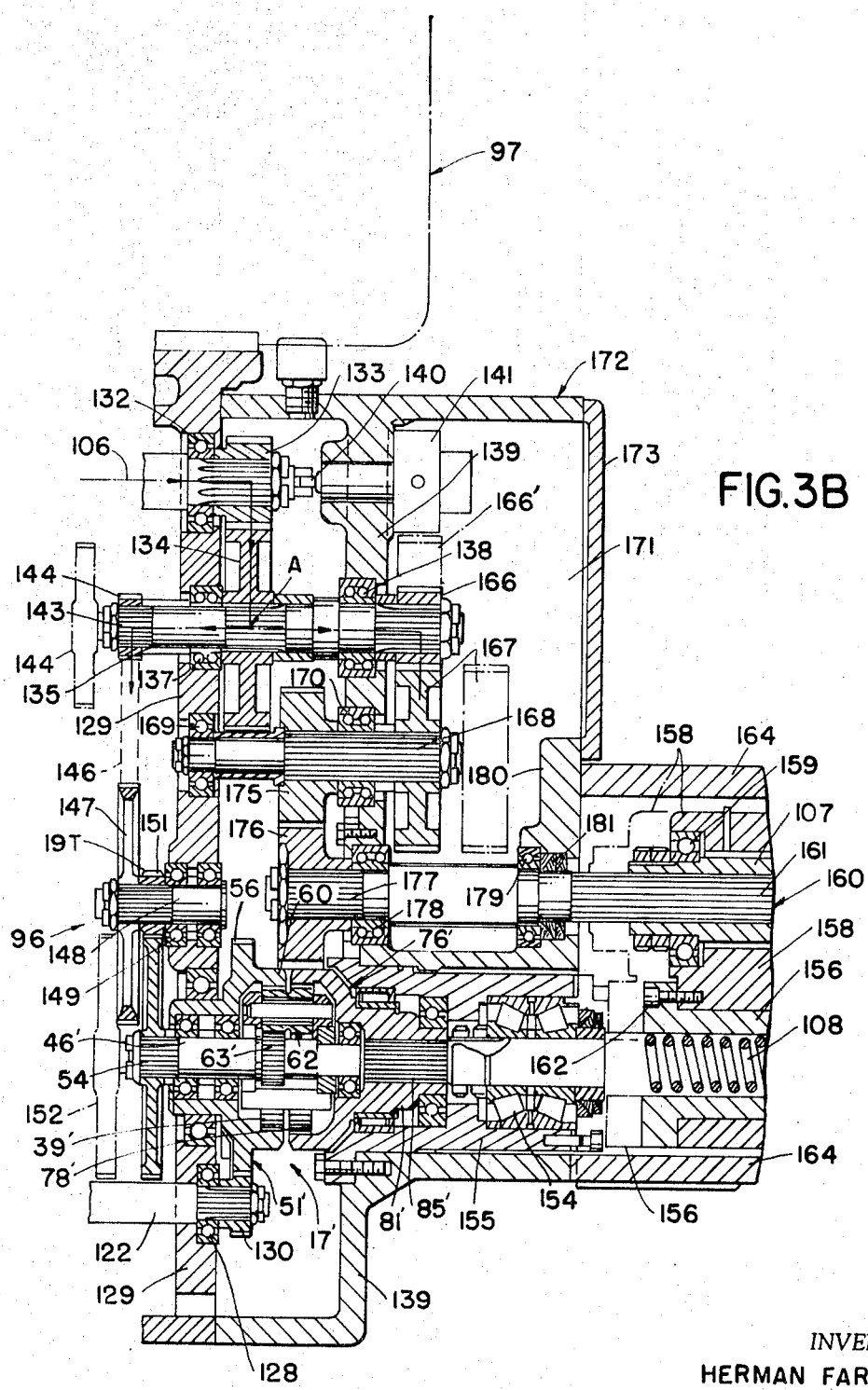

Brake 31 is of the same nature as the traverse motor brake incorporated in the quill unit embodiment of the invention, which is shown in FIGS. 3A and 3B; and features thereof will be described in further detail in connection with that embodiment.

To the right (FIG. 1) of internal housing wall 14, the traverse motor shaft 27 extends axially through a generously proportioned gear train space 38 between wall 14 and the end casing wall 13; and shaft 27 terminates in a reduced diameter and 39 journaled by a ball bearing 40 in a boss 41 of the housing end closure casting 16. In passing through an opening in housing wall 13, the traverse motor shaft has a power input pinion 42 splined thereon at 43, a sleeve or hub portion 44 of pinion 42 being piloted in the wall opening. Input pinion 42 transmits traverse motor drive to and through the speed reducer assembly 17 in a manner to be described. It is in order at this point, prior to describing connections from feed motor 20 to reducer 17, to explain structural features of the latter, reference being had to FIG. 2 in conjunction with FIG. 1.

Reducer Assembly

Figure 2:
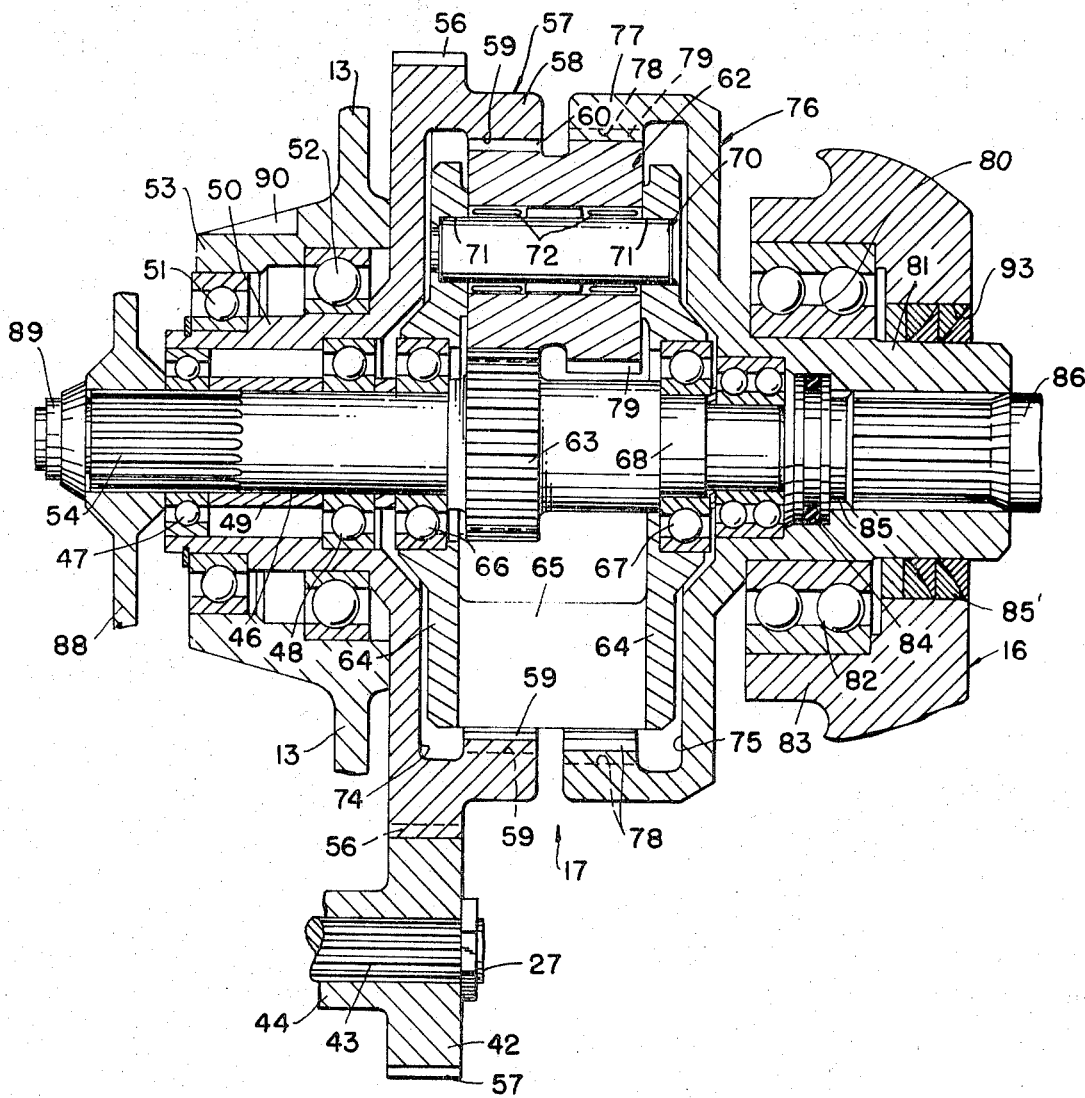
FIG. 2 is a view in vertical axial section through a two-state single planetary, fixed differential-type reducer assembly incorporated in both adaptations of the invention.

The reducer 17 comprises a central shaft 46 to which driving power from the feed motor 20 is applied. As shown in FIG. 2, this shaft is in part journaled by smaller and larger diameter ball bearings 47, 48, with a spacer 49 interposed therebetween, in an end hub or integral sleeve extension 50 of a first ring gear component, generally designated 51, of reducer assembly 17. Hub 50 is in turn journaled by smaller and larger diameter ball bearings 51, 52, respectively, in a central tubular boss 53 of housing wall 13. The left-hand end FIGS. 1 and 2) of reducer input shaft 46 is splined at 54 to receive driving power through a spur gear train (to be described) from feed motor 20.

First ring gear member 51 of reducer assembly 17 has external spur gear teeth 56, typically 121 in number about its periphery, which mesh with the teeth 57 of traverse motor-driven input pinion 42 to the reducer. Just to the right of the teeth 56 the ring gear member 51 has an annular flange 58 carrying on its inner periphery 83gear teeth 59 internally thereof; and these teeth mesh radially inwardly with one set 60 of 29 teeth of a unitary cluster gear 62, which is the single and only planetary of unit 17. The planetary teeth 60 radially inwardly mesh with, typically, 25 teeth of a sun gear 63 integrally formed on central shaft 46 of reducer assembly 17.

For the purpose of mounting the planetary gear 62, a pair of similar but oppositely oriented, disclike mounting plates 64, which are integrally braced and spaced axially from one another by a web or webs 65, as shown in FIG. 2, are journaled respectively by ball bearings 66, 67 on shaft 46, the former being just to the right of the bearing 48 and the latter being on a reduced diameter portion 68 of the shaft.

A journal pin 70 has its opposite ends staked in place in aligned openings 71 of the mounting plates 64, located radially outwardly of the axis of the unit 17, with needle bearings 72 interposed between pin 70 and the bore of the planetary cluster gear 62. Thus the plates 64, as joined by web means 65, constitute with the pin 70 and bearings 72 a rotative carrier for the single planetary 62 of the system. A reentrant space 74 in the ring gear member 51 accommodates the left-hand plate portion 64 of the corner; and the corresponding right-hand plate portion is received in a similar reentrant space 75 in the second ring gear member 76 of assembly 17.

Gear member 76 has an annular flange 77 projecting to the left (FIG. 2) thereof; and this flange has, typically, a set of 86 spur teeth 78 about its internal periphery, these teeth meshing with a second set of 32 teeth 79 on planetary gear 62.

Thus, with the 83 internal teeth 59 of first ring gear member 51 meshing with 29 teeth of the first gear set 60 of the planetary 62, with the latter meshing with the 25 teeth of sun gear 63, and with the second set of 32 teeth of the planetary meshing outwardly with the 86 internal teeth of the second ring gear member 76, a fixed and built-in speed reduction ratio of 66.5:1 is effected by and internally of speed reducer 17 alone.

Second ring gear 76, which is the output member of the reducer, is journaled by a double ball bearing 80 on a reduced diameter, right-hand pilot end of reducer shaft 46; and is provided to the right of that bearing with a rugged elongated hub 81, which hub is itself externally journaled by a double ball bearing 82 in a thickened end boss 83 of the end closure member 16 of housing 11. An O-ring 84 seals the interior of ring gear 76, hence the right-hand end of reducer 17 as a whole, from the internally splined inner periphery 85 of the hub 81, and end seals 85 protect bearing 82 from the exterior.

It is at the splining 85 that the drive screw 86 of a screw and nut unit (preferably a ball nut type) is drivingly connected for the advance and retraction of a way, saddle or platen member (not shown) of the embodiment 10 of the invention. Closure boss 83 is radially flanged (FIG. 1) to receive bolts by which the housing 11 is mounted to the bed or other fixed massive part (not shown) of the machine tool.

With special reference to FIG. 1, drive is applied to the reducer assembly 17 through a spur gear 87 fixedly connected to the end of feed motor shaft 23 on the right-hand side of internal housing wall 34, this gear meshing with a pinion or gear 88 fixed on reducer shaft 46 at the end splining 54 of the latter, with castellated nut means 89 holding the gears 87, 88 axially in place.

It is seen that the space 38 within housing 11 is ample in the axial sense to permit quick and easy change gear revisions of the gear train in this space, as by access from a suitably closed and sealed housing opening such as is typically shown in FIG. 3B, to be described. The boss 53 of housing wall 13 is shown as being slightly relieved at 90 to accommodate gear 87 when the latter is removed from the motor shaft 23, and other change or replacement gearing 88' is shown as also being conveniently accommodated in housing space 38.

In the operation of the embodiment 10 of the invention, more particularly in the feed phase thereof in which the way-borne tool is advanced toward the workpiece, the ring gear member 51 of reducer assembly 17 is held stationary by braking the latter from the electromagnetic brake unit 31, the traverse motor shaft 27 and the driving pinion 42. An equivalent of brake 31 is illustrated in greater detail in FIG. 3A. This is done through the agency of suitable bed and way limit switch provisions not germane to the invention.

With ring gear 51 thus held fast, torque from feed motor 20 is transmitted through gears 87, 88 to the input end of reducer shaft 46, driving the sun gear 63 of the latter. As thus driven, and the first set 60 of planet gear teeth meshing with the first set of ring gear teeth 59, the two-stage cluster gear 62 travels planetarily, with its second set 79 of teeth meshing with the teeth 78 of the second or output ring gear 76, occasioning a rotation of the latter at the stated speed reduction ratio. The output hub 81 and the way traverse screw 86 are driven at the vastly reduced speed appropriate for tool feed into the work.

In the traversing operation of the unit 10, torque from traverse motor 21 is transmitted from its output shaft 27 and pinion 42 thereon to the first ring gear 51. In the event that the input shaft 46 of reducer unit 17 is stationary or held stationary, the gear ring members 51 and 76 are locked together through planetary cluster gear 62 for a 1:1 ratio drive of the output hub 81 and feed screw 86.

If, however, the sun gear 63 is driven, it influences the traverse rate by adding or subtracting the feed rate. This is an important feature, for if the feed motor 20 is being driven at the changeover from rapid traverse to feed action the transmission is, as indicated above, a smooth and shock-free one, an important consideration in a motorized mechanical type of unit, whether of the way type or the quill type. Control of the feed motor is through limit switch means, as previously mentioned.

In a positive stop condition of unit 10, the second or output ring gear 76 of reducer 17 is stationary. Motor torque then flows from sun gear 63 through planet gear 62 to ring gears 51 and 76, thence to traverse motor pinion 42 and shaft 27, causing the spring-applied brake 31 to slip for the entire dwell period.

Again in reference to the feed phase of operation, the size of gears 87, 88 interposed in the train between the feed motor 20 and speed reducer 17 is determined variably by the required feed rate in operating on the workpiece. As for the traverse phase, brake 31 performs the function of (a) determining the maximum tool thrust, (b) bringing the traverse motor from rapid advance to a complete stop by going into the feed phase, and (c) bringing the unit to a complete stop at the end of the rapid return stroke.

Quill-Type Adaptation

Reference being had to FIGS. 3A and 3B, this unit is generally designated by the reference numeral 96. Its feed motor, shown in dot-dash line and generally designated 97, may be a three-horsepower one operating at 1,800 r.p.m.; and its traverse motor, generally designated 98, may be a three-quarter horsepower one operating at 3,600 r.p.m. The motors are each equipped with conventional spring-applied electromagnetic brakes 99, 100, respectively, which are released under 470 volt, three-phase, 60-cycle energization.

As shown in FIG. 3A, the output shaft 102 of feed motor 97 is key-connected to a small diameter sheave 103 about which a drive belt 104 is downwardly trained. Belt 104 drives a larger diameter sheave 105 keyed to an end of a feed motor driven shaft 106, which shaft acts as the power input member for both the feed and traverse actions of a tool mounting quill 107 (FIG. 3B), through the agency of a ball nut-type screw 108, as well as for the rotative drive of the tool (not shown) on the quill, in a manner to be described. An idler sheave 110 (FIG. 3A) is adjustably mounted, as on the housing 111 of feed motor brake 99, to regulate the tension of drive belt 104.

Brake 99 is an entirely conventional electromagnetic type, having braking discs 112 splined at 113 on shaft 106 and interleaved with intermediate discs 114 splined to brake housing 111. Coil springs 115 normally compress the disc means to apply the brake and half shaft 106. The brake is energized through a limit switch-controlled coil 116, whose core 117 attracts an armature 118 on the endmost disc 114 in opposition to the force of springs 115. Shaft 106 is journaled between its discs and its driving sheave 105 by means of a ball bearing 120 mounted in an end plate portion 121 of brake housing 111.

In general, the braking unit 100 for the traverse motor 98 is similar to feed motor brake 99; accordingly, corresponding parts are designated by corresponding reference numerals, primed, and further description thereof is dispensed with.

The shaft of the traverse motor 98, designated 122, is journaled in the motor housing 123, as shown in FIG. 3A, by a ball bearing 124, with a spacer 125 between the latter and the motor proper. Seals 126 surround shaft 122 to the right of bearing 124 and, as shown in FIG. 3B, the shaft extends to the right to a further ball bearing journal at 128 in an internal transverse wall 129 of the housing of the unit 96.

To the right of bearing 128 the shaft has a driving pinion 130 splined thereon, this pinion typically having nineteen teeth and meshing with the external teeth of the reducer assembly of the unit 96. Inasmuch as that assembly, as incorporated in unit 96, is in substance identical to the corresponding assembly 17 of the earlier unit 10, it and its corresponding parts are designated by corresponding reference numerals, primed, and further description is dispensed with.

Typically, the external gear teeth 56' (9) of the first ring gear member 51' are 79 in number; its internal gear 60' has 48 teeth meshing with a first set of teeth of planetary gear 62' numbering 15, which in turn mesh with the 18 teeth of sun gear 63'. The second ring gear member 76' typically has 50 internal teeth meshing with a second tooth set of the planetary cluster gear 62' having 17 teeth. These tooth relationships are, however, only illustrative.

It is now in order to describe the drive and gearing arrangements of the quill-type unit 96 by which its tool-powering quill 107 and its quill-advancing and retracting screw 108 are driven from the shafts 106 and 122, respectively, of the feed motor 97 and traverse motor 98. The feed motor driven arrangements will first be dealt with.

Reference being had to FIG. 3B, the feed motor output shaft 106 transmits torque bidirectionally, insofar as the line of power flow is concerned, along the arrow-bearing lines shown in dot-dash in FIG. 3B, the line of power transmission splitting at a point on FIG. 3B indicated by the character A for application to the speed reducer assembly 17' and to the quill 107, respectively.

Thus, feed motor output shaft 106, as journaled by a ball bearing 132 in housing wall 129, has a drive pinion 133, typically of 21 teeth, splined thereon to the right of wall 129; and these teeth mesh with those of a 50-tooth gear 134, which is splined on a relatively short power distributor shaft 135 paralleling shaft 106.

It is at the axis of shaft 135 that the flow of feed motor torque goes to the left for the drive of reducer 17', as indicated by arrows, and to the right for the rotative powering of quill 107, as similarly indicated. Shaft 135 is journaled, by ball bearings 137, 138 on either side thereof, respectively in housing wall 129 and a further transverse housing wall 139 paralleling the latter.

As an additional feature, feed motor output shaft 106 may be drivingly connected, as by a suitable coupling 140, to operate a small lubricating pump 141 carried by wall 139.

To the left of bearing 137, the power distributor shaft 135 has a splined connection at 143 (FIG. 3B) to a small pinion 144, typically of 19 teeth. This pinion may be replaced, as indicated in dot-dash line, by another pinion or gear 144'; and the line of force transmission from such gear means 144 or 144' is conventionally through offset-shaft gearing, not specifically shown but indicated in dotted line at 146 in the figure. Such gearing meshes with and drives a gear 147, typically having 70 teeth, which is splined on a stub shaft 148 journaled by ball bearings 149 in housing wall 129. A small diameter pinion 151 of 19 teeth is similarly splined on stub shaft 128 inboard of the gear 147, pinion 151 meshing with a gear 152 which is splined at 54' on the sun gear input shaft 46' of speed reducer 17'. As before, gear 152 may be removed, as indicated in dot-dash line, and replaced by a different size, consistent with any desired change in the train or spur gearing including pinion 144, gear 147 and pinion 151.

As shown at the right-hand lower side of FIG. 3B, the ball screw 108 is spline-driven at the output sleeve or hub 81' of the second ring gear member 76' of reducer 17'. Screw 108 is journaled in radial and axial thrust bearings 154, which are contained in a special housing insert 155 bolted to housing wall 139; and the screw 108 is threadedly received in a ball nut member 156, in a conventional manner. This nut member is in turn bolted to a quill slide 158, which carries a ball bearing 159 by which the internally splined quill 107 of unit 96 is rotatively journaled in slide 158. Quill 107 is rotatively driven by an elongated power spline 160, at spline formations 161 of the latter, to rotate any desired type of machine tool cutter or the like (not shown) in the workpiece-forming operation of unit 96.

Slide 158 is connected by bolts 162 to the ball nut 156 for the advance and retraction of the cutter prior to, during and after its machining operation, as indicated by solid and dot-dash lines in FIG. 3B, under the variable speed control of the feed and traverse motor-powered reducer assembly 17'. The quill and ball nut components are enclosed in an appropriate housing extension 164.

Now in regard to the rotative drive of the tool spline 161 and quill 107, reference being had to FIG. 3B, the line of torque transmission, commencing at point A on power distributor shaft 135, goes to the right to a 19-tooth pinion 166 splined on shaft 135 to the right of housing wall 139, this pinion meshing with a gear 167 of 44 teeth. Gear 167 is in turn fixedly connected on the right-hand end of a splined countershaft 168, which shaft is journaled by the respective ball bearings 169 and 170 in transverse housing walls 129, 139. As appears in FIG. 3B, there is ample space at 171 in the housing structure of unit 96, generally designated by the reference numeral 172, to permit gear 167 to be removed and replaced by one of a different size, of course with a corresponding change of pinion 166, as indicated at 166'. Access for this purpose is through an opening normally covered by a removable housing plate 173; and it is to be understood, as previously indicated, that similar gear change access provisions are made in the housing structure 11 of the earlier described, way-type unit 10 of FIG. 1.

A 33 tooth gear 175 is splined on shaft 168 directly to the left of its bearing 170, gear 175 meshing with a 34 tooth gear 176 which is drivingly connected at 177 to the left-hand end of power spline 161. The latter is stably journaled by a bearing 178 in housing wall 139 adjoining its spline formation 177, plus an additional ball bearing 179 carried by a transverse housing end wall formation 180. Sealing washers 181 surround the spline 160 just to the right of bearing 179.

It is believed that the operation of unit 96 is clear from what has been said. Its speed reducer 17' operates identically to the assembly 17 of FIGS. 1 and 2 in all phases of drive of the ball nut unit 108, 156, including the rapid in-traverse phase, the slow feed phase, the dwell phase and the tool retract phase. The range of speeds available, both as regards gearing associated with the reducer assembly 17' and that associated with the tool power quill 107, is greatly amplified by the change gear provisions referred to, which are roomily housed for ready and convenient access in making any desired changes.

The speed reducer assemblies 17, 17', being of a single planetary, two-stage cluster type, are simple, rugged and effective; and, as indicated above, afford a smooth and easy transition from traverse motor drive to feed motor drive, by reason of the possibility of rotating the respective sun gear shafts 46, 46' at the changeover time, and braking the latter during the remainder of the feed phase, if desired. All in all, the invention affords two embodiment of a wholly motorized machine tool control, each replacing, by rugged and readily controllable, electromagnetically braked motor units, associated change gearing and mechanical feed screw and quill components, the comparatively bulky and expensive, combined motor and hydraulic provisions commonly employed in the art.

I claim:

1. In combination in a machine tool, an electrically powered feed motor to advance and rotate a quill-type tool-driving member as the latter operates on a workpiece in a feed phase, an electrically powered traverse motor to advance the said member to operating engagement with the workpiece in a traverse phase, at least the traverse motor having a brake operatively connected thereto, a planetary reducer assembly whose rotative power output is effective to advance said member in both of said feed and traverse phases, said assembly comprising an input sun gear to the shaft of which torque is transmitted from said feed motor, an input ring gear surrounding said sun gear and driven by the traverse motor, an output ring gear from which said assembly transmits torque to advance said tool-driving member, a planetary carrier journaled coaxially of the sun gear axis, and a single unitary, two-state planetary gear journaled on said carrier, said planetary gear having coaxial sets of spur teeth, said input and output ring gears having sets of teeth meshing respectively with said sets of the planetary gear, and gearing to drivingly connect said reducer assembly to said motors, including a gear member driven by said traverse motor and meshing with one of said ring gears, and gear means drivingly connecting said reducer assembly at said sun gear thereof with said feed motor, and means to rotatively drive said tool-driving member in engagement with the workpiece, including further gear means powering said last named drive means from one of said motors.

2. The combination of claim 1, in which said first-named gear means includes replaceable spur gears drivingly connecting the shaft of the feed motor with said sun gear of the reducer assembly.

3. In combination in a machine tool, an electrically powered feed motor to advance and rotate quill-type tool-driving member as the latter operates on a workpiece in a feed phase, an electrically powered traverse motor to advance the said member to operating engagement with the workpiece in a traverse phase, said motors having parallel output shafts and at least the traverse motor having an electromagnetically responsive, spring-applied brake operatively connected to the output shaft thereof and operative to brake the latter in said feed phase, a planetary reducer assembly whose rotative power output is effective to advance said member in both of said feed and traverse phases, said assembly comprising an input sun gear to the shaft of which torque is transmitted from said feed motor, an input ring gear surrounding said sun gear and driven by the traverse motor, an output ring gear from which said assembly transmits torque to advance said tool-driving member, a planetary carrier journaled coaxially of and by the sun gear shaft, and a single unitary, two-stage planetary gear journaled on said carrier, said planetary gear having coaxial sets of different numbers of spur teeth, said input and output ring gears having sets of internal teeth meshing respectively with said sets of the planetary gear, one of said planetary sets meshing externally with said input ring gear, and gear means drivingly connecting said reducer assembly at said sun gear thereof with said feed motor, and means to rotatively drive said tool-driving member in engagement with the workpiece, including further gear means powering said last-named drive means from said feed motor, said last-named means having a changeable spur gear train drivingly connected to said last-named motor.

4. In combination, a pair of electrically powered motors, a spring-applied, electromagnetically released brake controlling the shaft of one of said motors, and means drivingly connecting said motors to a rotary quill-type tool-driving member to advance said member at lesser and greater speeds, respectively, in feed and traverse phases of operation of said member, said means comprising a speed reducer assembly gear-connected to said motors and including input and output ring gear members, a single sun gear, and a single, two-stage cluster gear having coaxial gear tooth sets meshing respectively with said ring gear members, one of said sets also meshing with said sun gear, and means ro rotatively drive said tool-driving member from one of said motors in at least a part of the advance thereof.

5. The combination of claim 4, in which said means to advance said tool-driving member comprises change gearing to further alter the reduction ratio as accomplished by s aid reducer assembly for the feed phase.

6. In combination, a pair of electrically powered motors, the shafts of which are on parallel, transversely spaced axes, a spring-applied, electromagnetically released brake controlling the shaft of each of said motors, and means drivingly connecting said motors to a rotary quill-type tool-driving member to advance said member at lesser and greater speeds, respectively, in feed and traverse phases of operation of said member, said means comprising a speed reducer assembly gear-connected to said motors and including input and output ring gear members, a single sun gear, and a single, two-state cluster gear having coaxial gear tooth sets of different number meshing respectively with said ring gear members, one of said sets also meshing with said sun gear, and means to rotatively drive said tool-driving member from one of said motors in at least a part of the advance thereof.

7. In combination in a machine tool, an electrically powered feed motor to advance and rotate a quill-type tool-driving member as the latter operates on a workpiece in a feed phase, an electrically powered traverse motor to advance the said member to operating engagement with the workpiece in a traverse phase, at least the traverse motor having a brake operatively connected thereto, a planetary reducer assembly whose rotative power output is effective to advance said member in both of said feed and traverse phases, said assembly comprising an input sun gear to the shaft of which torque is transmitted from said feed motor, an input ring gear surrounding said sun gear and driven by the traverse motor, an output ring gear from which said assembly transmits torque to advance said tool-driving member, a planetary carrier journaled coaxially of the sun gear axis, and at least one two-stage planetary gear journaled on said carrier, said planetary gear having coaxial sets of spur teeth, said input and output ring gears having sets of teeth meshing respectively with said sets of the planetary gear, and gearing to drivingly connect said reducer assembly to said motors, including a gear member driven by said traverse motor and meshing with one of said ring gears, and gear means drivingly connecting said reducer assembly at said sun gear thereof with said feed motor, and means to rotatively drive said tool-driving member in engagement with the workpiece, including a line of transmission having further gear means powering said last-named drive means from one of said motors.

8. In combination, a pair of electrically powered motors, a spring-applied, electromagnetically released brake controlling the shaft of one of said motors, and means drivingly connecting said motors to a rotary quill-type tool-driving member to advance said member at lesser and greater speeds, respectively, in feed and traverse phases of operation of said member, said means comprising a speed reducer assembly gear-connected to said motors and including input and output ring gear members, a sun gear, and a two-stage cluster gear having coaxial gear tooth sets meshing respectively with said ring gear members, one of said sets also meshing with said sun gear, and means to rotatively drive said tool-driving member from one of said motors in at least a part of the advance thereof.

9. In combination, a pair of electrically powered motors, the shafts of which are on parallel, transversely spaced axes, a spring-applied, electromagnetically released brake controlling the shaft of each of said motors, and means drivingly connecting said motors to a rotary quill-type tool-driving member to advance said member at lesser and greater speeds, respectively, in feed and traverse phases of operation of said member, said means comprising a speed reducer assembly gear-connected to said motors and including input and output ring gear members, a sun gear, and a two-stage cluster gear having coaxial gear tooth sets of different number meshing respectively with said ring gear members, one of said sets also meshing with said sun gear, and means to rotatively drive said tool-driving member from one of said motors in at least a part of the advance thereof.